Nov. 9, 1965 — C. ROSENTHAL — 3,216,566
STABILIZER-LUBRICANT AGGREGATE
Filed April 8, 1964
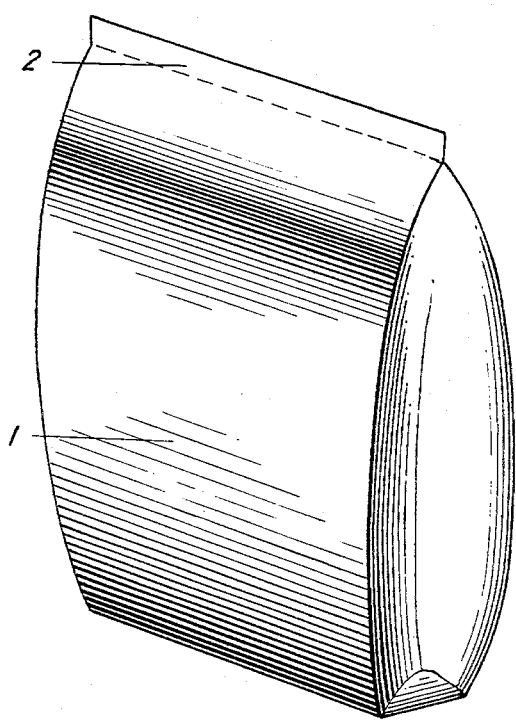

United States Patent Office 3,216,566
Patented Nov. 9, 1965

3,216,566
STABILIZER-LUBRICANT AGGREGATE
Christian Rosenthal, Munich, Germany, assignor to Chemische Werke Munchen Otto Barlocher G.m.b.H., Munich, Germany
Filed Apr. 8, 1964, Ser. No. 358,244
Claims priority, application Germany, Apr. 11, 1963, C 10,382
2 Claims. (Cl. 206—84)

The present invention relates to stabilizer-lubricant aggregates for the production of plastic preparations adapted for being further processed. The invention also pertains to related methods.

Procedures are known which comprise weighing stabilizers, lubricants, fillers and other additives, prior to further processing (e.g., the production of plastic bodies) in the respectively required amounts and putting the same into the molding compound to be processed and then intimately mixing the base material and the materials so added.

In addition to being complicated, this method has still other disadvantages. For example, some of the materials, especially the stabilizers, are frequently toxic substances and, due to the dusty state of such additives, considerable risks are incurred upon weighing and adding the same to the basic material. This is so important that many possibilities have been investigated to make these products, which are almost always present in a pulverulent, dust-producing form, less dangerous for the processor.

Another disadvantage of the known methods resides in the possibility of making weighing errors at the working zone where processing is effected.

Advantageously, the present invention provides a stabilizer-lubricant aggregate for the production of plastic preparations designed to be processed further or capable of being so processed, the stabilizer and the lubricant being enclosed in a casing made of a material which permits bringing the components of the mixtures into direct contact with each other during the mixing process or, quite generally, under the conditions under which the stabilizer and the lubricant are mixed with the plastic base compound. In accordance with the invention, the casing or envelope is dissolved or destroyed under the mixing conditions. This dissolution or destruction can be caused by chemical and/or mechanical attack.

It falls entirely within the scope of the present invention for said casing, which is capable of being destroyed under the mixing conditions, to contain, in addition to the desired and required amount of stabilizer and lubricant, other additives such as fillers, plasticizers or the like.

The fact that the type and manner of the compounds contained in the aggregates according to the invention are adjusted in such a manner that weighing can be dispensed with and that the aggregates according to the invention are added in an amount or number corresponding to the specific quantities of plastic to be processed, permits the elimination of the previous complicated weighing operations for the different additives and, more particularly, avoiding the injurious effects of dust by adding the unopened aggregates to the base compound and by subsequent mixing.

Advantageously the casing or envelope has the form of a bag or of a sack, it is proposed, according to one embodiment of the invention, that the casing or envelope be made of the same plastic as the base material. The casing or envelope may also preferably by made of materials which are readily compatible at least with said base material. The use of thermoplastic plastics, such as polyvinyl chloride, polyethylene and the like as casing or envelope material, has produced particularly favorable results.

Casings or envelopes, closed in an airtight manner, especially by being heat-sealed, have given good results.

When liquid stabilizers, lubricants or other additives are used, it is advisable to use these substances in the aggregate in the form resulting from a preliminary dispersing of said additives in a small amount of the plastic base compound. This method produces the particularly advantageous aggregate wherein pulverulent substances are incorporated.

The subject matter of the present invention is illustrated in the accompanying drawing, in which the bag-like casing or envelope 1 comprises the heat-sealed or glued closure portions or members 2. It is, of course, possible to have the heat-sealing or gluing extend around the entire envelope.

From the above it will appear that the invention is concerned with the provision of an article of manufacture adapted for use in the preparation of a plastic material to be formed from a determinable base compound which is adapted for being mixed under determinable conditions with selective additives constituted, for example, by a stabilizer and a lubricant.

This article of manufacture will comprise, in accordance with the invention, a container of thermoplastic material or the like adapted for being destroyed under the aforesaid determinable conditions and the stabilizer and lubricant, for example, in pulverulent form in hermetically sealed relationship within the container. Said article may further comprise a filler and a plasticizer and the like in the container.

It will appear that the invention is concerned with a method which comprises the pre-weighing of quantities of a stabilizer and a lubricant adapted for being mixed under predetermined conditions and in predetermined quantities with a basic compound to form a plastic material, the aggregate of stabilizer and lubricant being preferably hermetically sealed in a container compatible with the aforesaid basic compound and adapted for being destroyed under said predetermined conditions, the thusly packaged stabilizer and lubricant being added to the compound under the aforesaid conditions to form the plastic material.

In accordance with one aspect of the invention, certain chemical conditions which exist during the preparation of the plastic materials may be employed to destroy the aforesaid container. Under other circumstances, the mechanical conditions of the process may be employed to destroy the container. In any event, the mechanical and chemical steps are known to those skilled in the art and need not be listed in this disclosure to enable those skilled in the art to practice the invention.

The following are non-limitative examples of the aforegoing:

*Example 1*

From different supply hoppers, there is successively conveyed over worm conveyors into a polyethylene bag a supply of 2.5 kg. triple basic lead sulphate, 1 kg. neutral lead stearate, 0.2 kg. calcium stearate and 0.1 kg. stearic acid. The bag is positioned for this purpose on an automatic scale which controls the conveyors. The bag is then sealed.

*Use.*—The polyethylene bag with the filling, as described, serves as a stabilizer lubricant aggregate for working 100 kg. polyvinyl chloride for cable mixtures. The bag is added to the cable mixture of PVC fillers, pigments, plasticizer, etc., and is destroyed during the mechanical mixing step.

The triple basic lead sulphate, therefore, serves as a stabilizer, the neutral lead stearate as a stabilizing lubricant and the calcium stearate and stearate acid as pure lubricants.

*Example 2*

120 kg. barium laurate, 60 kg. cadmium laurate, 10 kg. zinc stearate, 10 kg. pentaerythritol, 10 kg. diphenylolpropane and 30 kg. glycerine monostearate are mixed homogeneously at room temperature for 20 minutes. While the mixer is operating, 1.2 kg. of the mixture is supplied through a worm conveyor into individual PVC bags until 200 bags are filled. The bags rest on an automatic scale which controls the conveyor.

The bags are sealed and they serve as stabilizer lubricant aggregate for working 50 kg. PVC to be used in the manufacture of artificial leather. The barium laurate, cadmium laurate and pentaerythritol serve as stabilizers, the zinc stearate as a synergistic stabilizer with inherent lubricant property, the glycerine monostearate as a pure lubricant and the diphenylolpropane as an anti-oxidant.

The PVC bag is simply added to the artificial leather mixture of PVC softener pigment, etc., and it is destroyed during mechanical mixing.

There will now be obvious to those skilled in the art many modifications and variations of the articles and methods set forth above. These modifications and variations will not depart from the scope of the invention if defined by the following claims.

Thus it is possible to use containers of cellular structure and to load different materials in different cells. However, it is preferred to combine the materials in an intimate mixture.

What is claimed is:

1. An article of manufacture comprising a container of thermoplastic material, said thermoplastic material being selected from the group consisting of polyvinyl chloride and polyethylene, and a mixture of a stabilizer, a stabilizer-lubricant, and at least one lubricant in pulverulent form in heremetically sealed relationship within said container.

2. An article of manufacture as claimed in claim 1, wherein said mixture comprises triple basic lead sulphate, neutral lead stearate, calcium stearate and stearic acid.

References Cited by the Examiner

UNITED STATES PATENTS

| | | | |
|---|---|---|---|
| 2,572,959 | 10/51 | Sparks et al. | 206—84 |
| 2,617,775 | 11/52 | Newberg et al. | 206—84 |
| 2,762,504 | 9/56 | Sparks et al. | 206—84 |
| 2,791,326 | 5/57 | Sparks et al. | 206—84 |
| 2,791,327 | 5/57 | Sparks et al. | 206—84 |

THERON E. CONDON, *Primary Examiner.*